United States Patent
Chen

(10) Patent No.: US 8,857,827 B2
(45) Date of Patent: Oct. 14, 2014

(54) MANUALLY DRIVEN CART WITH BIASED-DIRECTION REAR WHEELS

(76) Inventor: Shane Chen, Camas, WA (US)

( * ) Notice: Subject to any disclaimer, the term of this patent is extended or adjusted under 35 U.S.C. 154(b) by 98 days.

(21) Appl. No.: 12/558,384

(22) Filed: Sep. 11, 2009

(65) Prior Publication Data

US 2012/0211956 A1      Aug. 23, 2012

Related U.S. Application Data

(60) Provisional application No. 61/096,256, filed on Sep. 11, 2008.

(51) Int. Cl.
*B62B 3/00* (2006.01)
*B62B 3/14* (2006.01)

(52) U.S. Cl.
CPC ....... *B62B 3/1492* (2013.01); *B62B 2301/0465* (2013.01); *B62B 2301/044* (2013.01); *B62B 3/001* (2013.01); *Y10S 280/04* (2013.01)
USPC ................. 280/47.34; 280/47.35; 280/DIG. 4

(58) Field of Classification Search
USPC ............................... 280/DIG. 4, 47.34, 47.35
See application file for complete search history.

(56) References Cited

U.S. PATENT DOCUMENTS

| | | | | |
|---|---|---|---|---|
| 4,029,311 A | * | 6/1977 | Chanslor et al. | 482/68 |
| 4,280,246 A | * | 7/1981 | Christensen | 16/35 D |
| 5,039,121 A | * | 8/1991 | Holter | 280/220 |
| 5,427,394 A | * | 6/1995 | Lauto | 280/47.35 |
| 5,943,735 A | * | 8/1999 | Walker et al. | 16/38 |
| 6,283,698 B1 | * | 9/2001 | Lee | 414/537 |
| 7,198,279 B2 | * | 4/2007 | Montalvo | 280/33.992 |
| 2006/0182578 A1 | * | 8/2006 | Morton | 414/537 |
| 2008/0148514 A1 | * | 6/2008 | Hancock et al. | 16/21 |
| 2008/0203689 A1 | * | 8/2008 | vom Braucke et al. | 280/47.35 |
| 2008/0209673 A1 | * | 9/2008 | Cooper et al. | 16/45 |

* cited by examiner

*Primary Examiner* — Hau Phan
*Assistant Examiner* — Bryan Evans

(57) ABSTRACT

A cart having a platform and at least one forward located non-direction biased caster wheel and two rearward located direction biased caster wheels. A second forward located non-direction biased caster wheel may be provided. Various cart types are disclosed including lumber, flatbed, nursery, utility and luggage carts. An embodiment for converting between biased direction and non-biased direction rear wheels is also disclosed.

17 Claims, 3 Drawing Sheets

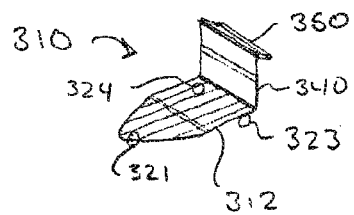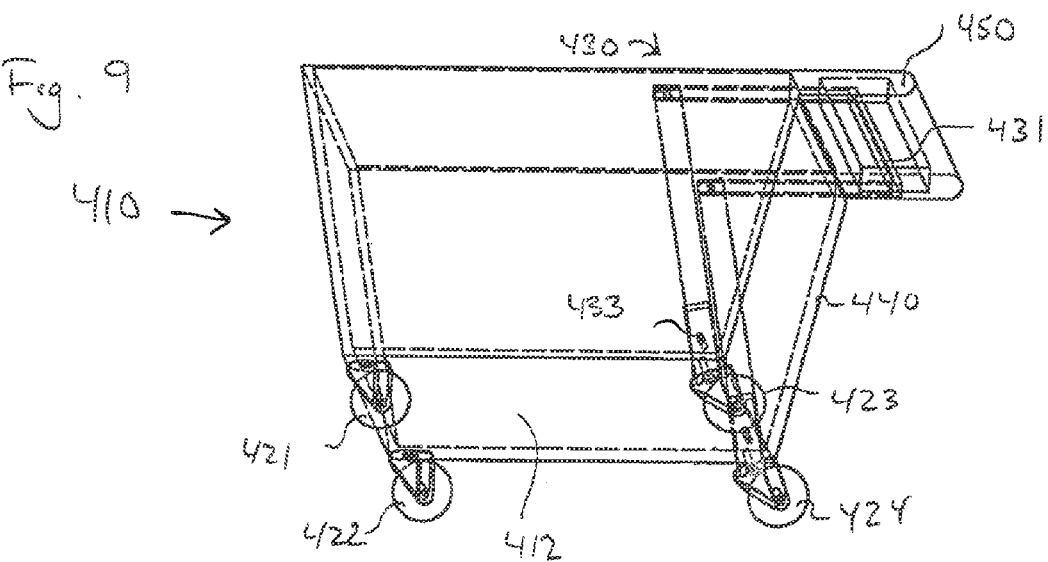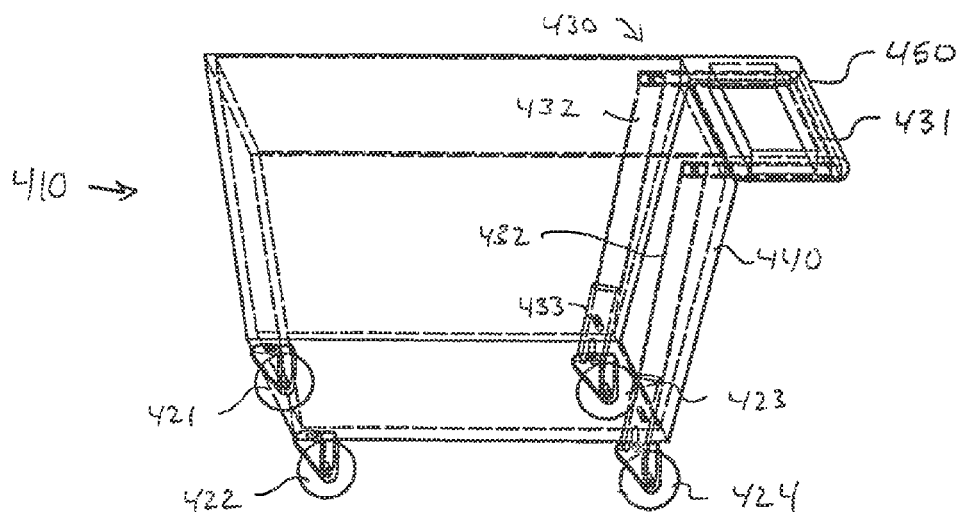

MANUALLY DRIVEN CART WITH BIASED-DIRECTION REAR WHEELS

CROSS REFERENCE TO RELATED APPLICATIONS

This application claims the benefit of U.S. Provisional Application No. 61/096,256, filed Sep. 11, 2008, entitled Shopping Cart with Directional Casters and having the inventor as above.

FIELD OF THE INVENTION

The present invention relates to shopping carts of the type used in department or grocery stores, and carts used in home-improvement stores, warehouses, nurseries and other locations. More specifically, the present invention relates to manually driven carts having an upright frame structure on which a user pushes to drive and steer the cart.

BACKGROUND OF THE INVENTION

Various shopping and/or goods-transporting carts are known in the art. These include at least two different styles of shopping cart which, for purposes of explanation, will be referred to as the American model and the European model.

American shopping carts tend to have two conventional caster wheels mounted at the front and two fixed-direction wheels mounted at the rear. A frame structure, often with a handle, through which the cart may be pushed and steered, is also provided at the rear, above the fixed-direction wheels.

The caster wheels in the front permit a user to readily alter the direction of the wheels (and hence the cart) by applying a steering force to the handle. The fixed-direction rear wheels do not turn, but simply follow the direction of the front wheels, pivoting on the floor if necessary.

Since the rear wheels are fixed-direction, the cart cannot be rolled sideways. To move the cart sideways, a user typically lifts the rear end and physically moves it sideways. This can be a strenuous and potentially hazardous undertaking, particularly if the cart is weighed down. Alternatively, the cart is rolled forward and then backward, perhaps repeatedly, moving the cart over a bit each time (similar to parallel parking). This latter process is disadvantageously time consuming and laborious.

European shopping carts, in contrast, typically include four conventional caster wheels, two at the front and two at the rear. The use of four conventional caster wheels permits the cart to be rolled forward and directed much like an American shopping cart yet also readily rolled sideways, because the caster wheels support movement in any direction. This arrangement is particularly useful for maneuvering carts in smaller or more crowded spaces so a cart may be readily moved to the side so that another may pass, for example.

While the four caster wheels convey ready multi-directional movement, this arrangement is disadvantageous in that the carts are unstable and may move in any direction. It can be a challenge for a user to move them forward in a reasonably straight line, the user constantly adjusting the directing force applied to the handle, at times struggling to control the direction of the cart, particularly when loaded.

A need exists for a cart that has the directional benefits of an American style cart with the ready lateral movement of a European cart.

SUMMARY OF THE INVENTION

Accordingly, it is an object of the present invention to provide a cart that overcomes the shortcomings of the prior art.

It is another object of the present invention to provide a cart that blends the advantages of an American model cart and a European model cart.

It is also an object of the present invention to provide a cart with direction biased rear caster wheels and one or more forward located conventional caster wheels.

These and related objects of the present invention are achieved by use of a manually driven cart with biased-direction rear wheels as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 8 is a perspective view of a three wheel cart having a caster wheel arrangement in accordance with the present invention.

FIGS. 9-10 are a perspective view of a cart in accordance with the present invention in which the rear wheels are movable between a biased direction configuration and a non-biased direction configuration.

DETAILED DESCRIPTION

Figure 1:
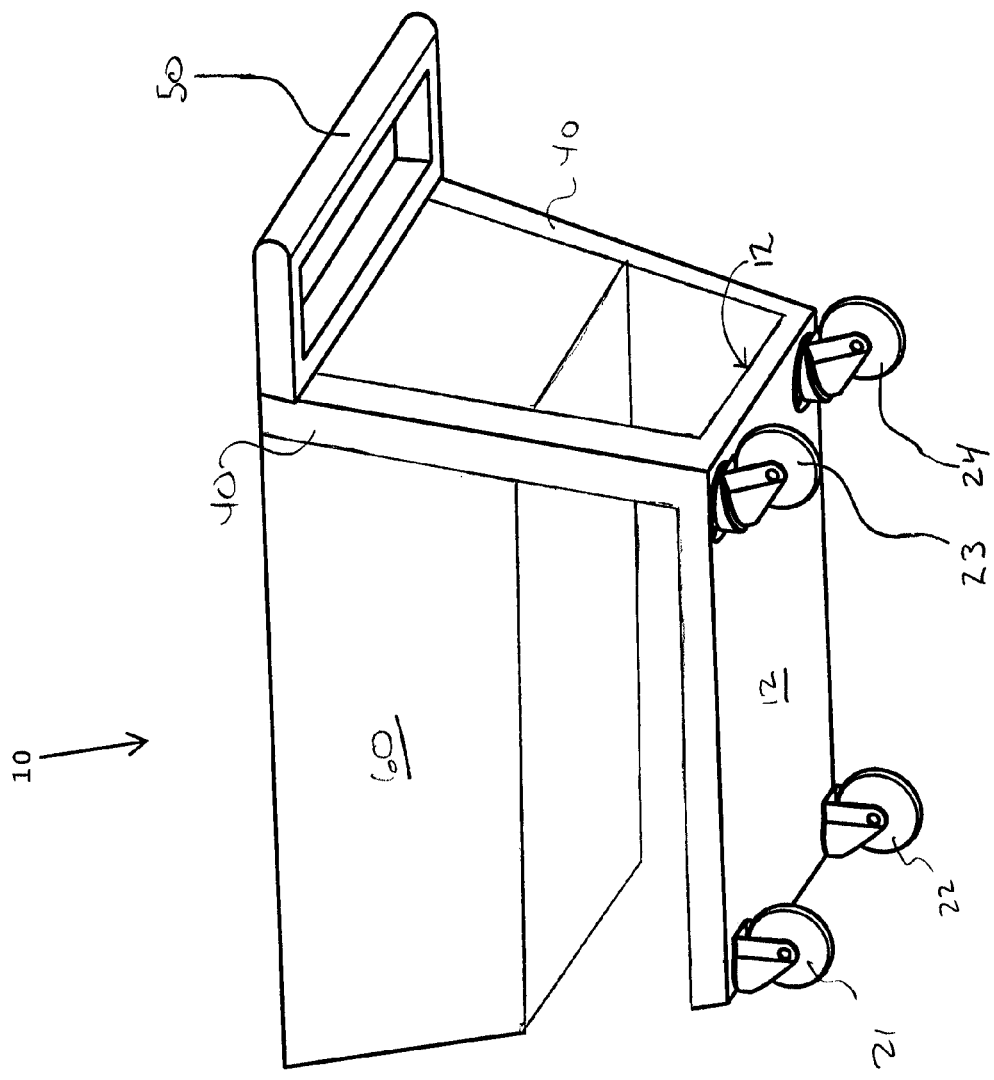
FIG. 1 is a perspective view of one embodiment of a cart in accordance with the present invention.

Referring to FIG. 1, a perspective view of one embodiment of a cart 10 in accordance with the present invention is shown. Cart 10 preferably includes a load bearing bottom platform or frame 12 on to which four wheels 21-24 are mounted. The front two wheels 21-22 are preferably conventional caster wheels or the like. The rear two wheels 23-24 are preferably direction-biased caster wheels.

A control frame or support 40 preferably extends upwardly from platform 12 and a handle (or other hand hold region) 50 is preferably provided on, or formed integrally with, support 40. Handle 50 is preferably positioned where it may be comfortably held by a user for pushing (or pulling) and steering. A basket 60 for holding goods may extend forward of support 40 and handle 50. Cart 10 with basket 60 approximates a typical grocery shopping cart. It should be recognized that the present invention also includes carts that do not have a typical grocery basket extension. These other carts include those that merely provide platform 12 and the control frame/handle, those with one or may trays instead of a basket, those with one or more shelves (common in nursery carts) and those with other goods support structures (e.g., lumber frames, etc.), among others. Some of these are discussed below.

Figure 2:
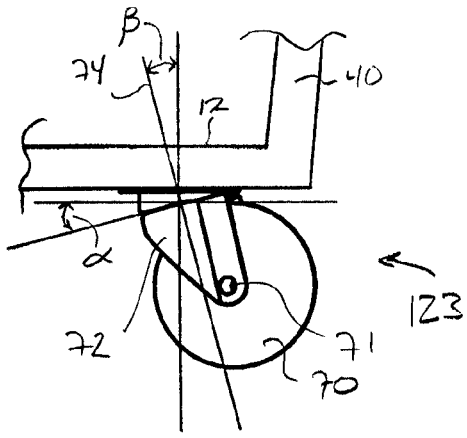
FIGS. 2-3 are side views of two different embodiments of a biased direction caster wheel in accordance with the present invention.

Referring to FIG. 2, a side view of one embodiment of a biased direction caster wheel 123 in accordance with the present invention is shown. Wheels 23-24 of cart 10 of FIG. 1 may be configured as wheel assembly 123.

A biased direction caster wheel is one that is biased to align in a given direction yet can be turned in another direction when a force countering the bias force is applied to the wheel. This bias can be assert by gravitational force, the weight of goods pushing a tilted caster wheel into a direction defined by the axis of tilt, or by mechanical force, a spring as discussed with reference to FIG. 3, or by another bias force or mechanism.

FIG. 2 illustrates wheel assembly 123 with a wheel 70 having an axle 71 that is supported by an axle frame 72. The axle frame is preferably pivotally mounted and angled downward in front. The angle of the pivot axis from vertical is β and the angle of the caster wheel from horizontal is α. These angles are the same and are preferably in the range of 3 to 40 degrees and more preferably in the range of 5 to 20 degrees, with the angle in FIG. 1 being approximately 10 degrees.

The pivot axis 74 is preferably provided in a vertical plane that is disposed in a straight forward line of direction. When cart 10 is pushed forward, the rear wheels are biased in a straight ahead direction and the cart operates similarly to an American model cart, making steering less burdensome and more predictable. When it is desired to move the cart sideways, however, pushing or pulling the cart to the side turns the biased wheels 23-24 towards the side and the cart freely moves in that direction. The rear wheels regain their straight ahead direction in the absence of the sideways, contra bias, force. In this manner, the benefits of the American and European model carts are achieved in one cart without their respective shortcomings.

Figure 3:
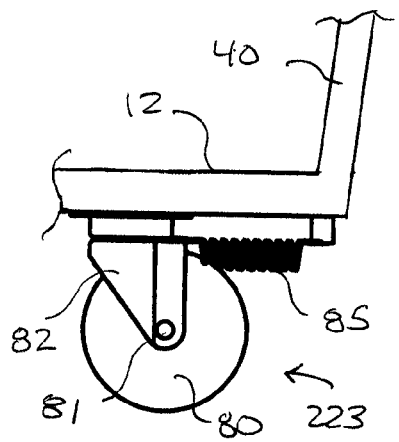
Figure 4:
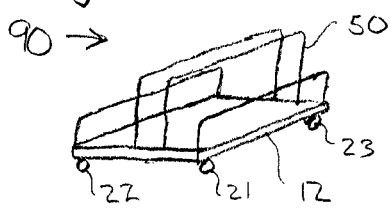
FIGS. 4-7 are perspective views of carts having a caster wheel arrangement in accordance with the present invention.
Figure 5:
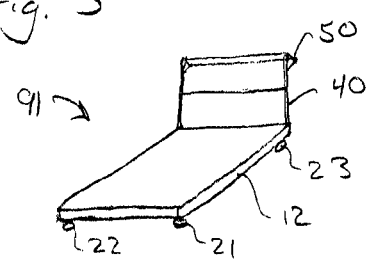
Figure 6:
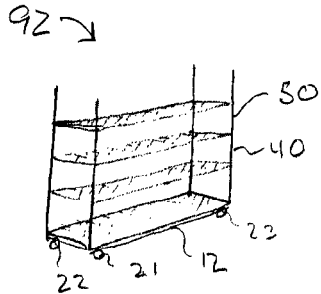
Figure 7:
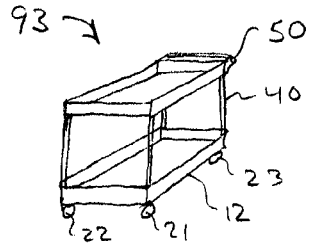

Referring to FIG. 3, a side elevation view of another embodiment of a biased direction caster wheel 223 in accordance with the present invention is shown. Wheels 23-24 of cart 10 of FIG. 1 may be configured as wheel assembly 223.

Wheel assembly 223 of FIG. 3 functions similarly to wheel assembly 123 of FIG. 3. It includes a wheel 80, an axle 81 and an axle frame 82. The axle frame may be pivotally mounted, for example, in the same manner as a conventional caster wheel. The axle frame, however, is also coupled to a direction biasing spring 85 or the like. The spring is positioned such that it exacts a preferably forward-directed bias on the axle frame and in turn on wheel 80, biasing wheel 80 to roll in the straight forward direction.

Exerting a sideways force on the cart counters the force of the spring and permits a turning of wheel 80, enabling a user to readily push the cart sideways. The wheel snaps back to a forward direction in the absence of the counter bias force. This arrangement, like the biased-direction wheel arrangement of FIG. 2, provides the advantages of both the American style and European style carts, while eliminating their disadvantageous aspects.

Referring to FIG. 4-7, are perspective views of different carts in accordance with the present invention. The carts include a lumber cart 90, a flatbed cart 91, a nursery cart 92 and a utility cart 93, respectively. Each cart includes a platform 12, two forward located conventional caster wheels 21-22 and two rearward located biased direction caster wheels 23-24 (24 is obscured from view). The platform, for example, in the flatbed cart and the utility cart may have a non-water permeable top surface.

A control frame 40 ascends from the platform (and may take different shapes depending on the use of the cart) and a hand holding or pushing region ("hand control region") 50 is provided with or formed inherently in the frame 40. For example, in the lumber cart 90 and nursery cart 92, the hand control region 50 is provided by forming the frame members of suitable size and shape that they may be grasped by a human hand.

Referring to FIG. 8, a perspective view of another embodiment of a cart 310 in accordance with the present invention is shown. Cart 310 is similar in some aspects to cart 10 of FIG. 1, though it has a single front wheel 321. Front wheel 321 is preferably non-direction biased (e.g., a conventional caster wheel), similar to wheel 21, while the two rear wheels 323-324 are direction biased, similar to wheels 23-24. The wheels are mounted to a platform frame 312. A control structure 340 ascends from the platform 312. While the control structure 340 is shown coupled to the rear end of the cart, it may also be coupled to the front end or otherwise arranged (in this and other embodiments). A handle 350 may be coupled to the control frame 340.

Three wheel carts of the type shown in FIG. 8 are common in airports for transporting luggage, etc., though a three wheel cart within the present invention may be used in other locations and for other purposes. While cart 310 is shown without a tray, basket or shelf, one or more may be provided.

Referring to FIG. 9-10, perspective views of another embodiment of a cart 410 in accordance with the present invention is shown. In cart 410, the rear casters wheels 423, 424 may be moved between a direction biased configuration (FIG. 9) and a non-direction biased configuration (FIG. 10).

Cart 410 may have a platform 412 and wheels 421-424 that are similar to those of cart 10. A linkage assembly 430 is provided that permits the rear wheels 423-424 to transition between the direction biased wheel arrangement and the non-direction biased wheel arrangement.

The linkage assembly may include an engagement member or trigger 431, configured to move with respect to handle 450, that is movably coupled to link members 432. Link members 432 are in turn coupled to caster wheels 423-424 and mounted in a sliding pivot arrangement about pivot pin 433. When trigger 431 is pulled, the link members move such that the front end of the wheel assemblies housing wheels 423-424 are pulled up towards horizontal, converting the wheel from direction biased to non-direction biased. In the non-direction biased configuration, the rear wheels function the same as the front wheels (as conventional caster wheels). Thus, with all four wheels effectively operating as non-direction biased wheels, the cart operates as a European model cart.

When trigger 231 is released, linkage member 232 descends and the forward tilt angle is returned to the rear caster wheels reconverting them to biased direction wheels. The pivot 433 is preferably provided forward of wheels 423, 424 so that the weight of the cart causes those wheels to revert to a direction-biased configuration when trigger 431 is released.

The platform, frame and related components may be made of metal, wood, plastic or other suitable components. Conventional caster wheels are known in the art.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A manually propelled cart device, comprising:
   a platform frame;
   first and second non-direction biased caster wheels coupled to the platform frame towards a front thereof;
   third and fourth direction biased caster wheels coupled to the platform frame towards a rear thereof;
   a non-steering wheel coupled control frame extending upwardly from the platform frame and configured to be contacted by the hand of a user during use to steer and propel the cart; and wherein the control frame is coupled toward the rear of the platform frame proximate the direction biased wheels and ascends there above so that a user has ready leverage over the direction biased wheels to maneuver those wheels, and thereby the cart device, sideway;

wherein the direction biased caster wheels have a sufficient turning range while under the bias that the cart device can roll primarily sideways relative to a straight forward line of travel, when moved in that direction via the control frame; and wherein at least one of the third and fourth direction biased caster wheels is direction biased due to a forward tilting of the caster wheel, and the forward tilting of the caster arrangement is at an angle in the range of 3 to 40 degrees.

2. The device of claim 1, wherein the forward tilting of the caster arrangement is at an angle in the range of 5 to 20 degrees.

3. The device of claim 1, wherein the direction biased caster wheels have a sufficient turning range under the bias that the cart device can roll substantially perpendicularly relative to a straight forward line of travel.

4. The device of claim 1, further comprising a handle coupled to the control frame.

5. The device of claim 1, further comprising a basket coupled to and extending forward of the control frame, the basket being wholly supported by the control frame.

6. The device of claim 1, wherein the platform frame has at least four corners and the control frame includes at least four upwardly disposed post members provided one each at the four corners, at least one tray being disposed between the four post members.

7. The device of claim 6, wherein in tray has a continuous, non-water permeable top surface.

8. The device of claim 1, wherein the control frame includes a trigger handle and a linkage mechanism, the linkage mechanism coupled between the trigger handle and the third and fourth caster wheels, and wherein the trigger handle, linkage mechanism and third and fourth caster wheels are configured such that movement of the trigger handle causes the linkage mechanism to move the third and fourth caster wheels between a direction biased arrangement a substantially non-direction biased arrangement.

9. A manually propelled cart device, comprising:
a platform frame;
a first non-direction biased caster wheel coupled to the platform frame towards a front thereof;
a first and a second direction biased caster wheels coupled to the platform frame towards a rear thereof;
a non-steering wheel coupled control member ascending from the platform frame and connected to the platform frame at least at a rear portion thereof;
wherein the biased direction caster wheels are biased due to:
a forward tilting of the caster wheel; and
wherein the direction biased caster wheels have a sufficient turning range while under the bias that the cart device can roll primarily sideways relative to a straight forward line of travel.

10. The device of claim 9, further comprising a second non-direction biased caster wheel coupled to the platform frame towards a front thereof.

11. The device of claim 9, wherein the forward tilting of the caster arrangement is at an angle in the range of 5 to 20 degrees.

12. The device of claim 9, wherein the first and second direction biased caster wheels have a sufficient turning range under the bias that the cart device can roll substantially perpendicularly relative to a straight forward line of travel, when moved in that direction via the control member.

13. The device of claim 9, further comprising a control frame incorporating the control member; and wherein the platform frame has at least four corners and the control frame includes at least four upwardly disposed members provided one each at the four corners, at least one tray being disposed between the four upwardly disposed members.

14. The device of claim 9, further comprising a linkage mechanism coupled between the control member and the first and second direction biased caster wheels for moving the first and second direction biased caster wheels between a direction biased configuration and a non-direction biased configuration in response to movement of the control member.

15. A manually propelled cart device, comprising:
a platform frame;
a first non-direction biased caster wheel coupled to the platform frame towards a front thereof;
third and fourth direction biased caster wheels coupled to the platform frame towards a rear thereof, at least one of the third and fourth direction biased caster wheels being direction biased due to a forward tilting of the caster wheel;
a control member extending upwardly from the platform frame and configured to be contacted by the hand of a user during use to steer and propel the cart; and
wherein the control member is coupled toward the rear of the platform frame proximate the direction biased wheels and ascends there above so that a user has ready leverage over the direction biased wheels to maneuver those wheels, and thereby the cart device, sideways;
wherein the direction biased caster wheels have a sufficient turning range under the bias that the cart device can roll primarily sideways relative to a straight forward line of travel, when moved in that direction via the control member;
wherein the control member includes a trigger handle and a linkage mechanism, the linkage mechanism coupled between the trigger handle and the third and fourth caster wheels, and
wherein the trigger handle, linkage mechanism and third and fourth caster wheels are configured such that movement of the trigger handle causes the linkage mechanism to move the third and fourth caster wheels between a direction biased arrangement and a substantially non-direction biased arrangement.

16. The device of claim 15, wherein the trigger handle, linkage mechanism and third and fourth caster wheels are configured such that substantially rearward movement of the trigger handle causes the linkage mechanism to move the third and fourth caster wheels from a direction biased arrangement toward a substantially non-direction biased arrangement.

17. The device of claim 15, wherein the trigger handle, linkage mechanism and third and fourth caster wheels are configured such that substantially forward movement of the trigger handle causes the linkage mechanism to move the third and fourth caster wheels from a substantially non-direction biased arrangement toward a direction biased arrangement.

* * * * *